United States Patent
Alles et al.

(10) Patent No.: US 12,480,091 B2
(45) Date of Patent: Nov. 25, 2025

(54) STREAMLINED METHODS FOR MAKING LIQUID MEDIA

(71) Applicant: LIFE TECHNOLOGIES CORPORATION, Carlsbad, CA (US)

(72) Inventors: Neva Alles, Grand Island, NY (US); Deirdre Eychner, Kearneysvelle, WV (US); Gabrielle Lorenzo, West Seneca, NY (US); Mary Reynolds, North Tonawanda, NY (US); Paul Gulde, Clarence Center, NY (US); Ryan Boniface, Depew, NY (US); Mwita Phelps, Buffalo, NY (US); Matthew Kahn, Amherst, NY (US); Richard Fike, Clarence, NY (US)

(73) Assignee: Life Technologies Corporation, Carlsbad, CA (US)

( * ) Notice: Subject to any disclaimer, the term of this patent is extended or adjusted under 35 U.S.C. 154(b) by 146 days.

(21) Appl. No.: 16/764,692

(22) PCT Filed: Nov. 16, 2018

(86) PCT No.: PCT/US2018/061603
§ 371 (c)(1),
(2) Date: May 15, 2020

(87) PCT Pub. No.: WO2019/099891
PCT Pub. Date: May 23, 2019

(65) Prior Publication Data
US 2021/0171901 A1 Jun. 10, 2021

Related U.S. Application Data

(60) Provisional application No. 62/587,325, filed on Nov. 16, 2017.

(51) Int. Cl.
*C12N 5/00* (2006.01)

(52) U.S. Cl.
CPC .......... *C12N 5/0031* (2013.01); *C12N 5/005* (2013.01); *C12N 2500/14* (2013.01); *C12N 2500/16* (2013.01); *C12N 2500/22* (2013.01); *C12N 2500/24* (2013.01); *C12N 2500/32* (2013.01); *C12N 2500/36* (2013.01); *C12N 2500/38* (2013.01); *C12N 2500/46* (2013.01); *C12N 2500/60* (2013.01); *C12N 2510/02* (2013.01)

(58) Field of Classification Search
CPC .. C12N 5/0031; C12N 5/005; C12N 2500/14; C12N 2500/16; C12N 2500/22; C12N 2500/24; C12N 2500/32; C12N 2500/36; C12N 2500/38; C12N 2500/45; C12N 2500/60; C12N 2510/02
See application file for complete search history.

(56) References Cited

U.S. PATENT DOCUMENTS

| | | |
|---|---|---|
| 5,474,931 A | 12/1995 | Disorbo et al. |
| 2006/0003447 A1 | 1/2006 | Fike et al. |
| 2008/0227136 A1 | 9/2008 | Pla et al. |
| 2011/0129926 A1 | 6/2011 | Fike et al. |
| 2015/0337258 A1 | 11/2015 | Von et al. |

FOREIGN PATENT DOCUMENTS

| | | | |
|---|---|---|---|
| JP | H06500703 A | 1/1994 | |
| WO | WO 2013158275 A1 * | 10/2013 | ............ C07K 16/24 |
| WO | WO-2016091350 A1 | 6/2016 | |

OTHER PUBLICATIONS

Huk et al., Induction of apoptosis and necrosis by metal ions in vitro, Journal of Arthroplasty, 19(8)(3): 84-87. (Year: 2004).*
International Search Report and Written Opinion for Application No. PCT/US2018/061603, mailed Mar. 26, 2019, 14 pages.
Alberts B.M: "Essential Cell Biology," Dec. 1, 1999, p. 138.

* cited by examiner

*Primary Examiner* — Arthur S Leonard
*Assistant Examiner* — Joseph Paul Miano

(57) ABSTRACT

Provided herein are, inter alia, methods for preparing a liquid cell culture media that has lesser lot-to-lot analytical variation, increased performance, and has lesser metal ion concentrations compared to a liquid media prepared by traditional methods. Such liquid media may be used for culturing cells, including but not limited to, recombinant cells.

21 Claims, 9 Drawing Sheets

|  | 12N Concentrated HCl (mL/L) | 5N HCl (mL/L) | 5N NaOH (mL/L) |
|---|---|---|---|
| Acid Solubles | 3.62 | 0 | 0 |
| Acid Solubles II | 0.96 | 0 | 0 |
| Salts I | 0 | 0.045 | 0 |
| Salts II | 0 | 0.11 | 0 |
| Alkaline Solution | 0 | 0 | 0.03 |
| Iron Chelate Solution | 0 | 0.007 | 0 |
| Final Formulation | 0 | 1.662 | 12.37 |
| Subtotal | 4.58 | 1.824 | 12.4 |
| Total | 18.804 mL/L = 1.88% of final volume | | |

FIG. 2

STREAMLINED METHODS FOR MAKING LIQUID MEDIA

CROSS-REFERENCE TO RELATED APPLICATIONS

This application is a 371 of International Application no. PCT/US2018/061603, filed Nov. 16, 2018, which claims priority to U.S. Provisional Application No. 62/587,325, filed Nov. 16, 2017, which disclosures are herein incorporated by reference in their entirety.

BACKGROUND

Liquid cell culture media manufacturing processes utilize large volumes of acids and bases to solubilize certain media components. Such additions into liquid formulations introduce lot-to-lot variability, may modify or damage sensitive media components over time and may introduce variations in metal ion concentrations. There is a long felt need for a reliable, efficient method for making liquid cell culture media, where metal ion concentrations can be controlled, and where there is reduction in the introduction of heavy metals, thereby reducing environmental concerns downstream.

BRIEF DESCRIPTION OF THE DRAWINGS

FIG. 2 Concentrate liquid method uses high quantities of acids and bases during preparation of the liquid stock components. The table shows that, in an exemplary liquid media prepared by concentrate technology, acids & bases account for 1.88% of the final volume. Here, concentrate technology used 18.804 mL/L of acid/base. The streamlined liquid method completely eliminated the use of 12N concentrated acid and significantly reduced the use of 5N acid and 5N base, thereby reducing the introduction of metal contaminants into the final formulation.

Figure 1:
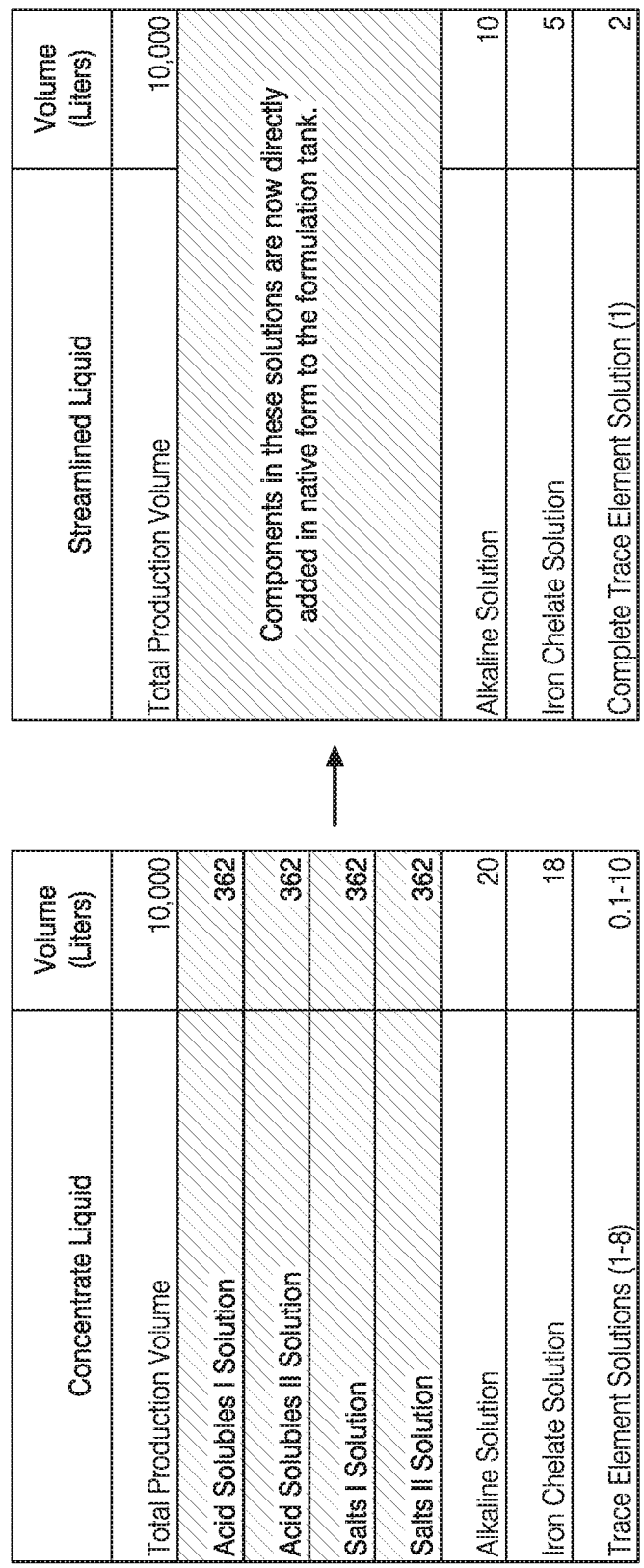
FIG. 1 depicts the comparison of liquid media prepared by the concentrate liquid method (table left) versus by the streamlined liquid method (table right). In one embodiment, the concentrate liquid technology took an average of 7 hrs production time whereas the streamlined liquid took an average of 3-4 hrs production time.

The present disclosure provides a method of making a liquid medium comprising:
i) grouping media components into groups based on their pH, solubility and concentration,
ii) converting an amino acid's free base form or salt form to target a particular pH according to the components in the formulation;
iii) performing addition of the groups in an order that permits optimal solubilization of said group;
wherein the resulting liquid medium requires lesser acid and/or base addition to solubilize the groups compared to a medium that is not prepared using steps i) ii) and iii) above (steps i), ii) and iii) form the streamlined method).

The resultant liquid medium using this method: (a) required lesser acid and/or base additions to solubilize the components; and/or, (b) had reduced metal contaminants from acid and/or base additions; and/or, (c) had less lot-to-lot variability in metals, and, (d) required lesser formulation time since lesser solutions needed to be prepared compared to a liquid medium prepared by another method not using the steps i), ii) and iii) described above for liquid medium preparation.

The liquid medium prepared by the method described above had several advantages: for instance, in one embodiment, the lot-to-lot variability due to metals in the liquid was reduced to less than up to 10%. In other embodiments, the lot-to-lot variability of total metal concentrations was reduced to less than about 0.001%, less than about 0.01%, less than about 0.1%, less than about 1%, less than about 1-2%, less than about 1-3%, less than about 1-4%, less than about 1-5%, less than about 1-6%, less than about 1-10%, less than about 1-20%, less than about 1-30%, less than about 1-40%, less than about 1-50%, less than about 1-60%, less than about 1-70%, %, less than about 1-80%, or less than about 1-90%. In other embodiments, the lot-to-lot variability for any metal concentration was less than about 0.001%, less than about 0.01%, less than about 0.1%, less than about 1%, less than about 2%, less than about 3%, less than about 4%, less than about 5%, less than about 6%, less than about 10%, less than about 15%, less than about 20%, less than about 30%, less than about 40%, less than about 50%, less than about 0.001-1%, less than about 0.001-5%, less than about 0.001-10%, less than about 1-10%, less than about 10-20%, less than about 20-30%, less than about 30-40%, less than about 40-50%, less than about 50-100%, less than about 50-90%, less than about 50-80%, less than about 50-70%, less than about 50-60%.

Another advantage in using the streamlined method is that the volume of acid and/or base addition to the liquid is reduced. For instance, in some embodiments, the reduction in the volume of acid and/or base is about 10-40 fold. In a particular embodiment, the reduction in the volume of acid and/or base is about 22 fold. In a certain embodiment, the use of 12N concentrated acid is eliminated in the streamlined method.

In one aspect, the reduction of the one or more contaminant metal in the liquid medium was about 0.0001% to 100% compared to liquid medium prepared by any other method, for e.g., the concentrate method. In other aspects, the reduction of the one or more contaminant metal is by about 0.0001% to 0.001%, about 0.0001% to 0.01%, about 0.0001% to 0.1%, about 0.0001% to 1%, about 0.0001% to 2%, about 0.0001% to 3%, about 0.0001% to 4%, about 0.0001% to 5%, about 0.0001% to 10%, about 1%-5%, about 1%-10%, about 1%-15%, about 1%-20%, about 1%-25%, about 1%-35%, about 10-20%, about 10-30%, about 10-40%, about 10-50%, about 10-60%, about 10-70%, about 10-80%, about 10-90%, about 10-100% compared to liquid medium prepared by any other method, for e.g., the concentrate method of preparing liquid media.

In one aspect, the contaminant metals that are reduced in the liquid medium are selected from the group consisting of: Cr, Fe, Mg, Cu, Mn, Ni, Zn, Mo, Al and Ca. In another aspect, the % metal contamination is reduced by: about 40-100% for Cr, about 0.01-20% for Fe, about 0.1-15% for Cu, about 0.25-60% for Mn, about 5-100% for Ni, about 5% for Zn, and about 15% for Mo compared to liquid medium prepared by any other method, for e.g., the concentrate method. In a particular aspect, the liquid cell culture medium has lower contaminant metal levels than a liquid medium prepared by another method.

The present disclosure also provides a liquid cell culture medium that is serum-free, a liquid cell culture medium that is protein-free, or both.

The present disclosure also provides methods for culturing a cell, comprising contacting the cell with the liquid cell culture medium prepared using the methods described above. In a preferred embodiment, the cells are selected from the group consisting of: primary epithelial cells (e.g., keratinocytes, cervical epithelial cells, bronchial epithelial cells, tracheal epithelial cells, kidney epithelial cells and retinal epithelial cells), established cell lines and their strains, recombinantly engineered cells, diploid cells, hybriomas, Chinese hamster ovary (CHO), HEK293 cells, TRG-2 cells, IMR-33 cells, Don cells, GHK-21 cells, citrullinemia cells, Dempsey cells, Detroit 551 cells, Detroit 510 cells, Detroit 525 cells, Detroit 529 cells, Detroit 532 cells, Detroit 539 cells, Detroit 548 cells, Detroit 573 cells, HEL 299 cells, IMR-90 cells, MRC-5 cells, WI-38 cells, WI-26 cells, $MiCl_1$ cells, CV-1 cells, COS-1 cells, COS-3 cells, COS-7 cells, Vero cells, DBS-FrhL-2 cells, BALB/3T3 cells, F9 cells, SV-T2 cells, M-MSV-BALB/3T3 cells, K-BALB cells, BLO-11 cells, NOR-10 cells, $C_3H/IOTI/2$ cells, $HSDM_1C_3$ cells, $KLN_2O_5$ cells, McCoy cells, Mouse L cells, Strain 2071 (Mouse L) cells, L-M strain (Mouse L) cells, L-MTK⁻ (Mouse L) cells, NCTC clones 2472 and 2555, SCC-PSA1 cells, Swiss/3T3 cells, Indian muntjac cells, SIRC cells, $C_{II}$ cells, and Jensen cells, Sp2/0, NS0, NS1 cells or derivatives thereof and iPSC cells.

The present disclosure further provides the cell that can either express: a recombinant product, a protein or a recombinant protein, a fusion product or protein, an antibody or an antibody fragment, a fusion or modified antibody, a virus or a viral product or component, a VLP (viral like particle), a cell, a nucleic acid, a lipid, a hormone, a steroid, or a glycoprotein.

The present disclosure further provides methods for making a biological product in a liquid medium prepared according to claim 3 13-18, wherein the biological product is a recombinant product, a protein or a recombinant protein, a fusion product or protein, an antibody or an antibody fragment, a fusion or modified antibody, a virus or a viral product or component, a VLP (viral like particle), a cell, a nucleic acid, a lipid, a hormone, a steroid, or a glycoprotein.

The present disclosure provides a liquid cell culture medium comprising reduced metal contaminants and/or showing reduced lot-to-lot variability in metals compared to a liquid medium prepared using another method wherein it uses acid and/or base additions to solubilize its components.

The present disclosure also provides a liquid cell culture medium prepared according to the methods described above (the streamlined method), wherein the liquid medium has less contaminant metals compared to liquid medium prepared by any other method, for e.g., the concentrate method of preparing liquid media.

The present disclosure also provides a kit or a combination comprising: (i) a liquid cell culture medium prepared according to the method of claims 1-12, (ii) cells, and optionally, (iii) a cell culture supplement or additive.

DESCRIPTION

1. Cell Culture Medium

A cell culture medium is composed of a number of ingredients and these ingredients vary from one culture medium to another. A cell culture medium may be a complete formulation, i.e., a cell culture medium that requires no supplementation to culture cells, or, may be an incomplete formulation, i.e., a cell culture medium may require supplementation or may be used as a supplement to supplement an incomplete formulation, or, in the case of a complete formulation, may improve cell culture performance or culture results (titers).

Generally a cell culture medium may have solutes dissolved in solvent. The solutes provide an osmotic force to balance the osmotic pressure across the cell membrane (or wall). Additionally, the solutes may provide nutrients for the cell. Some nutrients may be chemical fuel for cellular operations; some nutrients may be raw materials for the cell to use in anabolism; some nutrients may be machinery, such as enzymes or carriers that facilitate cellular metabolism; some nutrients may be binding agents that bind and buffer ingredients for cell use or that bind or sequester deleterious cell products.

Depending on the cell and the intended use of the cell, the ingredients of the cell culture medium can be determined at concentrations to balance/optimize cell culture performance. Performance may be measured in accordance with a one or more desired characteristics, for example, cell number, cell mass, cell density, $O_2$ consumption, consumption of a culture ingredient, such as glucose or a nucleotide, production of a biomolecule, secretion of a biomolecule, formation of a waste product or by product, e.g., a metabolite, activity on an indicator or signal molecule, etc. Each or a selection of the ingredients may thus preferably optimized to a working concentration for the intended purpose.

Culture media or feed supplements of the invention may be available in a dry format that requires only addition of a solvent such as water. Dry formats include, but are not limited to, dry powder format (DPM), agglomerated (AGT™) format, advanced powder media (APM), or other suitable dry formats, and have been described in other patents. Preferably, once water is added, dissolution should occur quickly and the resultant liquid can be filtered and added directly to the cells without any pH adjustment. The reconstituted medium or concentrated supplement may be prepared in variable bulk quantities and is amenable to sterilization, particularly by ionizing or ultraviolet irradiation. Media (dry and liquid) generally comprise the following:

a. Carbohydrates

Cell culture medium ingredients typically include a carbohydrate, amino acids, salts, trace elements, and vitamins. For mammalian cells, the main carbohydrate used in cell culture media is glucose, routinely supplemented at 5 to 25 nM. See Cell Culture Technology for Pharmaceutical and Cell-Based Therapies, 51 (Sadettin Ozturk and Wei-Shou Hu eds., Taylor and Francis Group 2006). In addition to glucose, any hexose like galactose, fructose, or mannose or a combination of these may be used. In addition, mammalian cells can also use glutamine as a major energy source. Glutamine is often included at higher concentrations than other amino acids (2-8 mM). However, as noted above, glutamine can spontaneously break down to form ammonia and certain cell lines produce ammonia faster, which is toxic. Therefore, glutamate and glutamine dipeptides have been used as substitutes for glutamine to reduce the build-up of toxic ammonia in the cell culture medium.

b. Amino Acids

Amino acids are important in cell culture medium for maintaining the metabolic function of the cultured cells. Cell culture medium typically includes the essential amino acids (i.e., those amino acids that are normally not synthesized in vivo by mammals) as well as certain non-essential amino acids. A non-essential amino acid is typically included in the cell culture medium if the cell line is not capable of synthesizing the amino acid or if the cell line cannot produce sufficient quantities of the amino acid to support maximal growth. Exemplary amino acids include L-alanine, L-arginine, L-asparagine, L-aspartic acid, L-cysteine, L-glutamic acid, L-glutamine, glycine, L-histidine, L-isoleucine, L-leucine, L-lysine, L-methionine, L-phenylalanine, L-proline, L-hydroxyproline, L-serine, L-threonine, L-tryptophan, L-tyrosine, and L-valine. The methods in this disclosure are directed to classifying amino acids, based on their properties as shown, for example, in Table 1. Such classifications are well known. However this disclosure aims at grouping and matching the amino acids in pH and concentration, and matching their addition so as to reduce or eliminate the addition of acids or base to achieve a desired pH, without compromising cell culture growth and titer performance from previously used methods using concentrate technology. Media concentrate technology has been described, for instance, in US patent application 5474931, whose disclosure is hereby incorporated by reference. An exemplary classification of amino acids is shown below in Table 1, where amino acids are grouped based on their acidic, basic or neutral properties. Titration of the amino acid groups, and matching of the groups based on pH and concentration while preparing the liquid media can achieve a desired pH without addition of as much acid and/or base described in 5474931, and as shown in the example below.

TABLE 1

| Properties | Amino acids |
| --- | --- |
| Basic | Arg, Lys, His |
| Acidic | Asp, Glu |
| Neutral (non polar) | Ala, Asn, Gln, Gly, Ile, Leu, Met, Phe, Pro, Val |
| Neutral (slightly polar) | Cys, Trp, |
| Neutral (polar) | Ser, Thr, Tyr, | c. Salts

Salts are added to cell culture medium to maintain isotonic conditions and prevent osmotic imbalances. The osmolality of standard mammalian cell culture medium is about 300 mOsm/kg, although many cell lines can tolerate an approximately 10% variation of this value. The osmolality of some insect cell cultures tend to be higher than 300 mOsm/kg, and this may be 0.5%, 1%, 2 to 5%, 5-10%, 10-15%, 15-20%, 20-25%, 25-30% higher than 300 mOsm/kg. The most commonly used salts in cell culture medium include Nat, $K^+$, $Mg^{2+}$, $Ca^{2+}$, $Cl^-$, $SO_4^{2-}$, $PO_4^{3-}$, and $HCO_3^-$ (e.g., $CaCl_2$), KCl, NaCl, $NaHCO_3$, $Na_2HPO_4$). Therefore, the desired osmolality for a cell culture medium for cultivation of a particular cell type may also be determined empirically by one of ordinary skill in the art, using art-known methods.

d. Inorganic Elements

Other inorganic elements that are present in serum in trace amounts can be included in cell culture medium, as described in US 2005/0287666, which is hereby incorporated by reference in its entirety. They include Mn, Cu, Zn, Mo, Va, Se, Fe, Ca, Mg, Si, and Ni. Other inorganic elements that have been added to cell culture medium, although not as frequently, include Al, Ag, Ba, Br, Cd, Co, Cr, F, Ge, J, Rb, and Zr. Many of these elements are involved in enzymatic activity. They may be provided in the form of salts such as $CaCl_2$, $Fe(NO_3)_3$, $MgCl_2$, $MgSO_4$, $MnCl_2$, NaCl, $NaHCO_3$, $Na_2HPO_4$, and ions of the trace elements, such as, selenium, vanadium and zinc. These trace elements may be provided in a variety of forms, preferably in the form of salts such as $Na_2SeO_3$, $NH_4VO_3$, etc. These inorganic salts and trace elements may be obtained commercially, for example from Sigma (Saint Louis, Missouri).

e. Vitamins

Vitamins are typically used by cells as cofactors. The vitamin requirements of each cell line vary greatly, although generally extra vitamins are needed if the cell culture medium contains little or no serum or if the cells are grown at high density. Exemplary vitamins include biotin, choline chloride, folic acid, i-inositol, nicotinamide, D-$Ca^{++}$-pantothenate, pyridoxal, riboflavin, thiamine, pyridoxine, niacinamide, A, $B_6$, $B_{12}$, C, $D_3$, E, K, and p-aminobenzoic acid (PABA).

f. Optional: Serum or Recombinant Serum Proteins

Serum, the supernatant of clotted blood, can be used in cell culture medium to provide components that promote cell growth and/or productivity. These serum components include attachment factors, micronutrients (e.g., trace elements), growth factors (e.g., hormones, proteases), and protective elements (e.g., antitoxins, antioxidants, antiproteases). Serum is available from a variety of animal sources including bovine or equine. When included in cell culture medium, serum is typically added at a concentration of 5-10%. Certain cell culture media are serum free.

g. Growth Factors

To promote cell growth in the absence or serum or in serum reduced media, one or more of the following polypeptides can be added to a cell culture medium: for example, fibroblast growth factor (FGF), including acidic FGF and basic FGF, insulin, insulin-like growth factor (IGF), epithelial growth factor (EGF), nerve growth factor (NGF), platelet-derived growth factor (PDGF), and transforming growth factor (TGF), including TGFα and TGFβ, any cytokine, such as interleukins 1, 2, 6, granulocyte stimulating factor, Leukocyte inhibitory factor (LIF), etc.

In certain embodiments, the cell culture medium does not contain a growth factor. In protein-free media, insulin may be replaced with zinc or a zinc containing compound, as described in WO 98/08934, which is hereby incorporated by reference in its entirety.

h. Lipids

One or more lipids can also be added to a cell culture medium. Serum typically contains lipids, such as fatty acids (e.g., linoleic acid, linolenic acid, arachidonic acid, palmitoleic acid, oleic acid, polyenoic acid, and/or fatty acids of 12, 14, 16, 18, 20, or 24 carbon atoms, each carbon atom branched or unbranched), phospholipids, lecithin (phophatidylcholine), and cholesterol. Alternatively, one or more of these lipids can be included as supplements in serum-free media. Phosphatidic acid and lysophosphatidic acid stimulate the growth of certain anchorage-dependent cells, such as MDCK, mouse epithelial, and other kidney cell lines, while phosphatidylcholine, phosphatidylethanolamine, and phosphatidylinositol stimulate the growth of human fibroblasts in serum-free media. Ethanolamine and cholesterol have also been shown to promote the growth of certain cell lines. In certain embodiment, the cell culture medium does not contain a lipid.

i. Optional: Carrier Proteins

One or more carrier proteins, such as bovine serum albumin (BSA) or transferrin, can also be added to the cell culture medium. Carrier proteins can help in the transport of certain nutrients or trace elements. BSA is typically used as a carrier of lipids, such as linoleic and oleic acids, which are insoluble in aqueous solution. In addition, BSA can also serve as a carrier for certain metals, such as Fe, Cu, and Ni. In protein-free formulations, non-animal derived substitutes for BSA, such as cyclodextrin, can be used as lipid carriers. Transferrin is involved in transporting iron across cell membranes. In certain cases, human serum albumin may be necessary for the cultivation of cells (for. e.g., such as in xeno-free (XF) culture) desirable for products generated for downstream therapeutic use. In other instances, recombinant human serum albumin may be used in the cell culture medium for the cultivation of cells. In particular cases, the recombinant human serum albumin may be derived from plant, algal or fungal sources such as rice, corn, potato, wheat, even yeast, etc. to provide for animal-origin free (AOF) culturing of cells. In protein-free formulations, transferrin can be replaced by ferric and/or ferrous salts, as described in WO 98/08934, which is hereby incorporated by reference in its entirety, or a hydroxypyridine derivative, as described in US 2007/0254358, which is hereby incorporated by reference in its entirety. Additionally, in protein-free formulations, insulin can be replaced by zinc, vanadium or other suitable divalent salts.

j. Optional: Attachments Proteins

One or more attachment proteins, such as fibronectin, laminin, and pronectin, can also be added to a cell culture medium to help promote the attachment of anchorage-dependent cells to a substrate.

k. Buffering Agent

The cell culture medium can optionally include one or more buffering agents. Suitable buffering agents include, but are not limited to, N-[2-hydroxyethyl]-piperazine-N'-[2-ethanesulfonic acid] (HEPES), MOPS, MES, phosphate, bicarbonate and other buffering agents suitable for use in cell culture applications. A suitable buffering agent is one that provides buffering capacity without substantial cytotoxicity to the cells cultured. The selection of suitable buffering agents is within the ambit of ordinary skill in the art of cell culture.

1. Polyanionic or Polycationic Compounds

Polyanionic or polycationic compounds can prevent the cells from clumping and promote growth of the cells in suspension. See WO 98/08934, which is hereby incorporated by reference in its entirety. Exemplary polyanionic compounds include polysulfonated or polysulfated compound, such as, heparin, dextran sulfate, heparan sulfate, dermatan sulfate, chondroitin sulfate, pentosan polysulfate, a proteoglycan or the like.

In addition, the cell culture medium may comprise one or more ingredients described here. In one embodiment, the cell culture medium may optionally comprise one or more of the following ingredients: ethanolamine, D-glucose, HEPES, insulin, a cytokine (e.g., IL-6), heparin, dextran sulfate, linoleic acid, lipoic acid, phenol red, PLURONIC® F68, putrescine, sodium pyruvate, transferrin, L-alanine, L-arginine, L-asparagine, L-aspartic acid, L-cysteine, L-glutamic acid, L-glutamine, glycine, L-histidine, L-isoleucine, L-leucine, L-lysine, L-methionine, L-phenylalanine, L-proline, L-serine, L-threonine, L-tryptophan, L-tyrosine, L-valine, biotin, choline chloride, D-$Ca^{++}$-pantothenate, folic acid, i-inositol, niacinamide, pyridoxine, riboflavin, thiamine, vitamin $B_{12}$, one or more calcium salts, $Fe(NO_3)_3$, KCl, one or more magnesium salts, one or more manganese salts, NaCl, $NaHCO_3$, $Na_2HPO_4$, one or more selenium salts, one or more vanadium salts and one or more zinc salts.

The liquid media described can be a 1× formulation, or can be concentrated as anything greater than a 1× formulation, for example, as a 2×, 5×, 10×, 20×, 50×, 500×, or 1000× medium formulation as the solubility of the individual components allow. If the medium ingredients are prepared as concentrated stock solutions by the concentrate method, an appropriate (sufficient) amount of each concentrate stock is combined with a diluent to produce a 1× medium formulation. Typically, the diluent used is water but other solutions including aqueous buffers, aqueous saline solution, or other aqueous solutions may be used. The 1× solution is prepared directly by the streamlined method, and is described further below and in the Examples. There is no need for the preparation of concentrated stock solutions in the streamlined method.

Methods for Preparing Liquid Media

Traditional Concentrate Method

A liquid 1× can be prepared using the 'concentrate' technology, as detailed in U.S. Pat. No. 5,474,931. In this 'concentrate' method, components or ingredients (as seen in Tables 2-5) can be prepared and stored in solution. Preferably, ingredients are grouped in concentrated solutions and stored. For example, a grouping may be the groups of amino acid ingredients shown in Tables 1. An exemplary grouping of the ingredients of Table 2 may be: i) acid soluble amino acids in one group, ii) certain vitamins and salts grouped together based on their reactivities, concentrations and compatibility; iii) trace metals grouped according to their solubility properties; iv) pluronic, glucose, buffers, other vitamins and salts grouped together based on their reactivities, concentrations and compatibility.

Stock solutions of the grouped ingredients can be made as concentrated stocks. For example, it is possible to make 10× to 100× chemical stock solutions, which can be stored as liquids or frozen in the appropriate aliquot sizes for later use.

Stock solutions offer a number of advantages. For example, a higher final concentration of a given ingredient can be used in the 1× medium. In addition, some ingredients are more stable when stored in a concentrated stock solution. Moreover, less storage volume is required for a concentrated stock solution than is required for a 1×medium. See U.S. Pat. No. 5,474,931. For exemplary methods on how to prepare stock solutions using the 'concentrate' method or for an exemplary grouping of acid soluble I, acid soluble II, salt I, salt II, see U.S. Pat. No. 8,198,084 (columns 25, 26, 27, 28-29, and Table 2 of U.S. Pat. No. 8,198,084 is hereby incorporated by reference in its entirety).

Streamlined Method

Figure 3A:
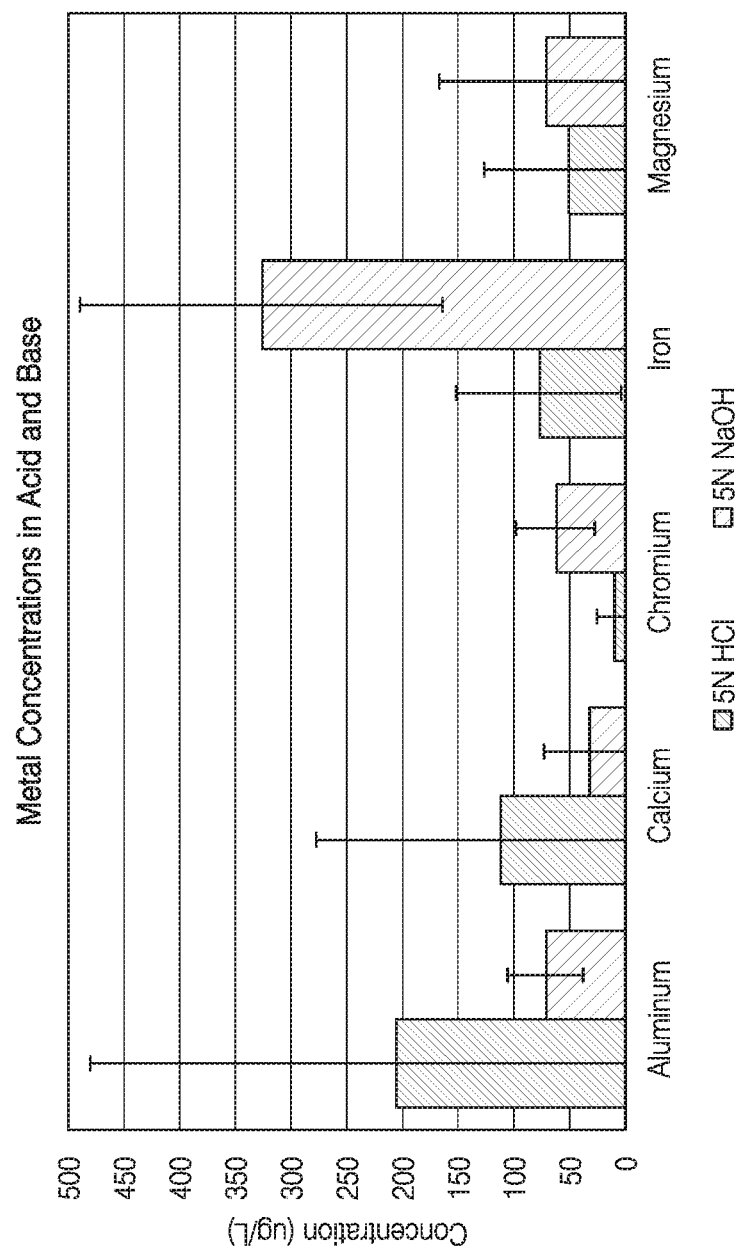
FIG. 3 depicts various metal concentrations (contaminants) measured in acid (5N HCl) and base (5N NaOH). Four lots of 5N HCl and 5N NaOH were analyzed by ICP-MS for metal contaminants Present concentrate liquid technology uses high volumes of acids and bases, which contributes to the variability in metal contaminant concentrations in the final liquid medium. (A) depicts amount of metals present in higher concentrations compared to metals that are less than 30 µg/L shown in (B). The streamlined liquid method eliminates the use of 12N concentrated acid, and significantly reduces the use of 5N acid and 5N base, thereby reducing the concentration and variability associated with metal contaminants.
Figure 3B:
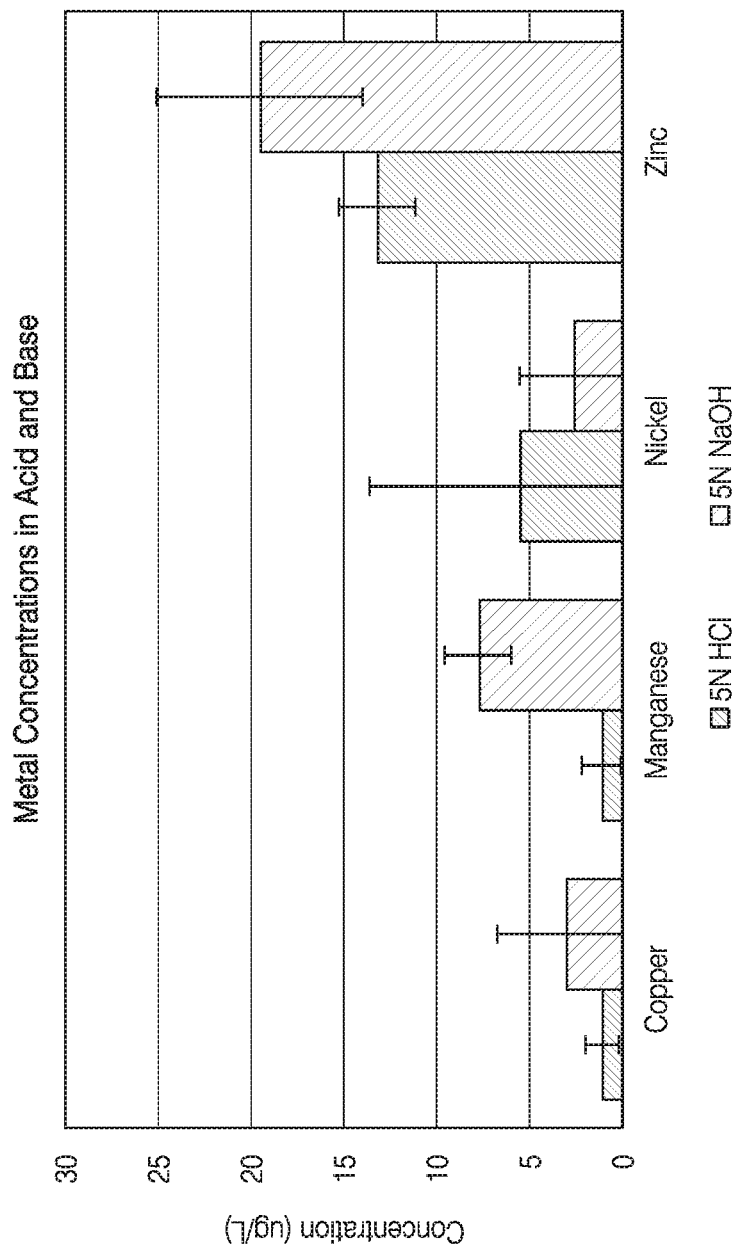
Figure 4A:
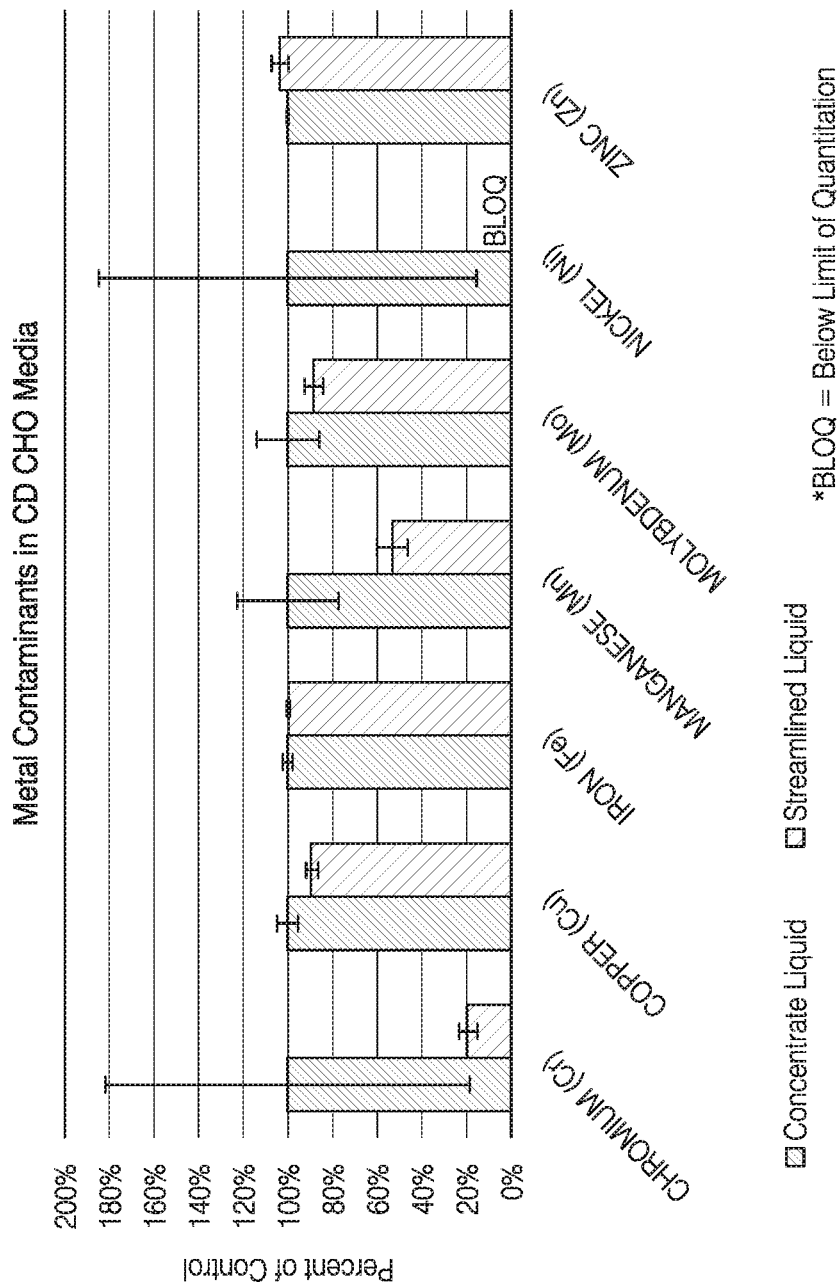
FIG. 4 shows the comparison of metal levels in media prepared by the concentrate liquid method versus by the streamlined liquid method. Media prepared by both these methods were analyzed by ICP-MS. The metal concentrations were normalized such that 100% represents the metals present in the 'concentrate' method (the control). (A) The streamlined method for preparing liquid CDCHO™ medium (from Life Technologies, Corp., Carlsbad, CA) resulted in lower metal concentrations of: chromium, copper, manganese and nickel compared to when prepared by the 'concentrate' method (control). (B) The streamlined method for preparing any liquid 293 medium (from Life Technologies, Corp., Carlsbad, CA) resulted in lower metal concentrations of: chromium, iron, manganese and nickel compared to when prepared by the 'concentrate' method (control).
Figure 4B:
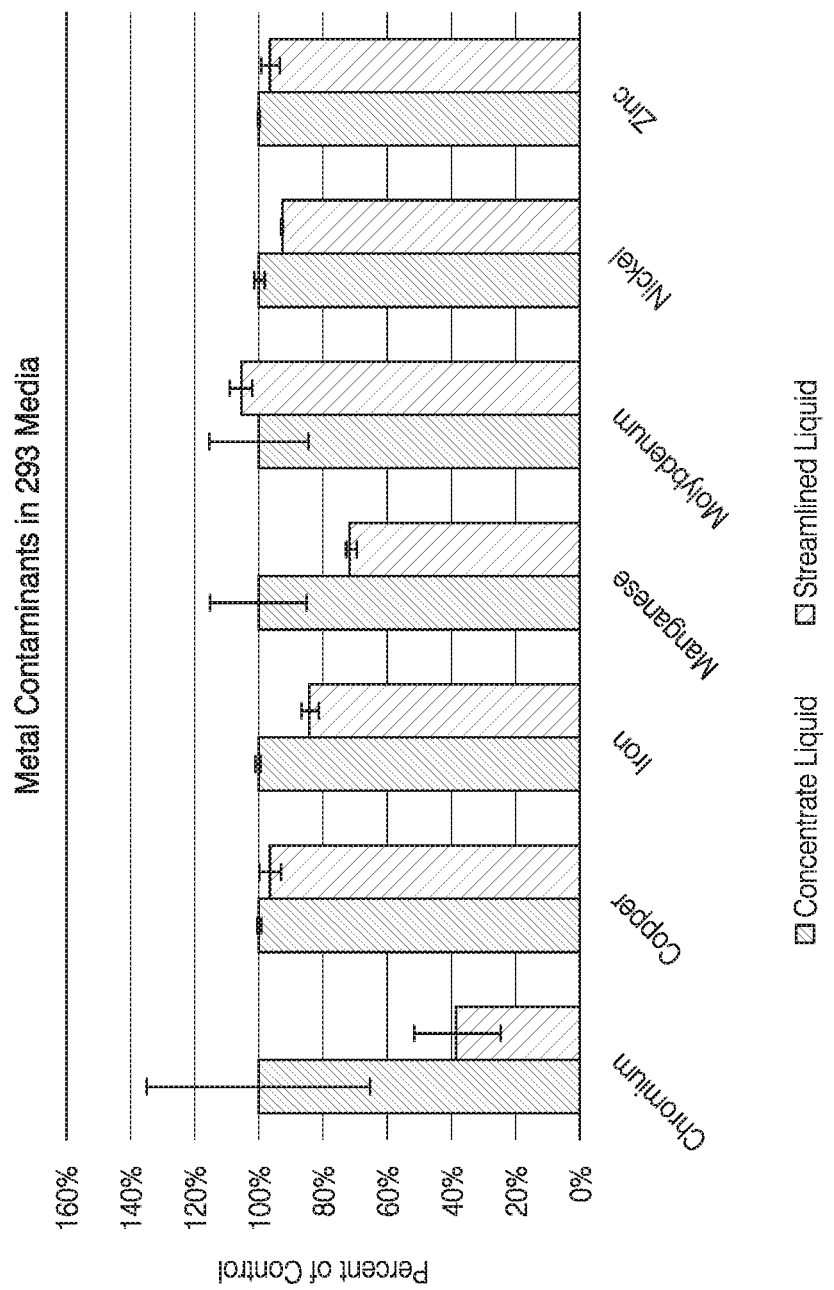
Figure 5A:
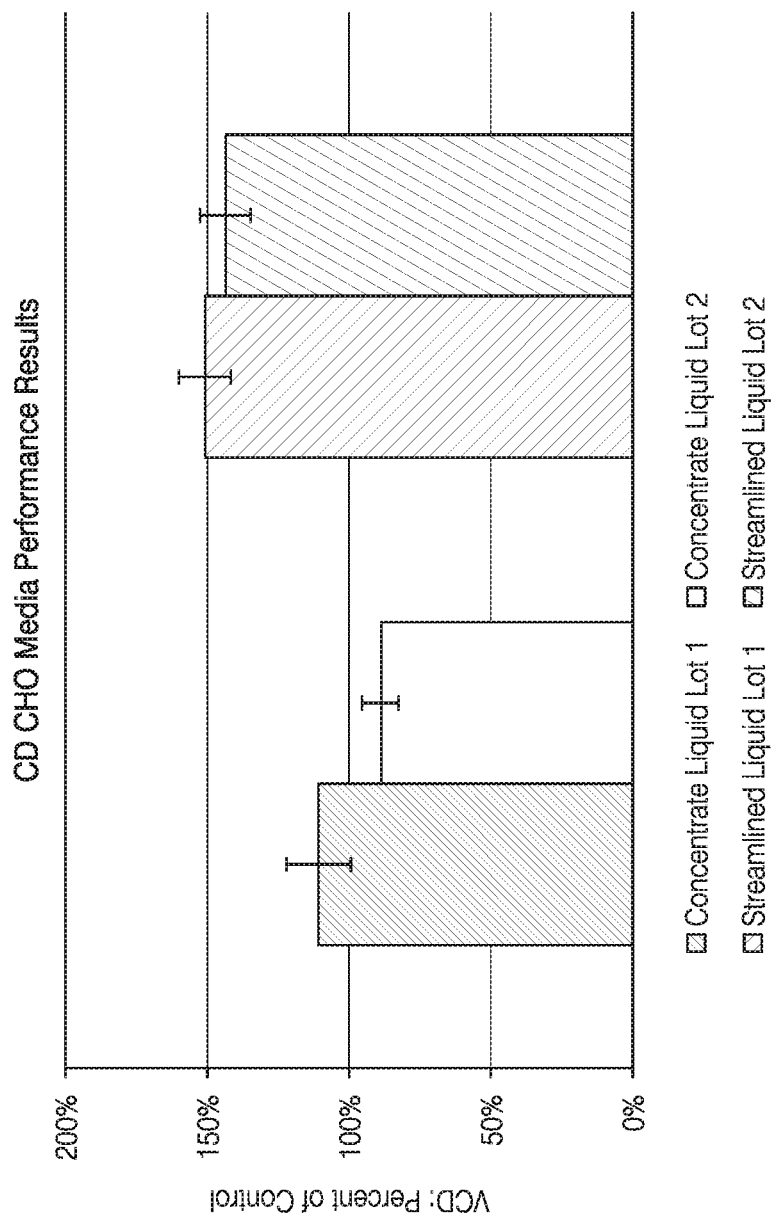
FIG. 5 depicts the comparison of cell growth measured by viable cell densities (VCD) of (A) CHO-S cells which showed improved growth of 147% in the streamlined liquid media, compared to the concentrate liquid control. (B) 293 cells had similar growth performance in the Streamlined Liquid media (105%) when compared to the Concentrate Liquid control.
Figure 5B:
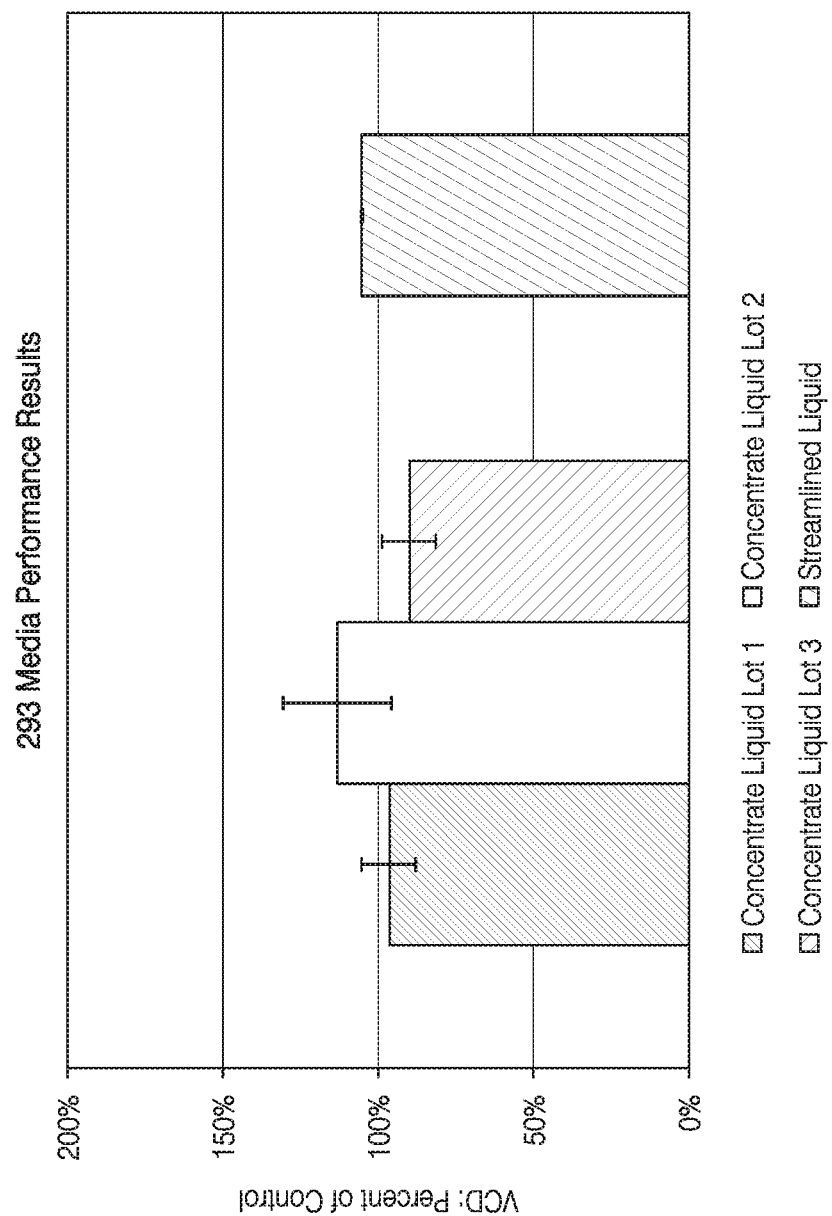

On the other hand, a liquid prepared using the 'streamlined' technology does the following:

i) Grouping: Components are grouped by type, pH, concentration and solubility, for e.g. alkaline amino acids, like Arg & Lys are grouped together; or amino acids are grouped into multiple sub-groups according to pH with acidic, basic and neutral groupings, and with the order of addition optimized based on theoretical solubilities, pH and bench top testing. An exemplary order of amino group addition to the formulation tank would be as follows: 1) acidic, 2) basic and 3) neutral;

ii) Converting an amino acid's free base form or salt form to target a particular pH according to the components in the formulation; and/or, converting tyrosine and cystine from free base to disodium salt forms, as appropriate for the formulation; and/or, converting phosphate forms from dibasic sodium phosphate to a combination of monobasic and dibasic forms to achieve a desired final target pH;

iii) Reducing addition of acid and/or base: The largest source of inconsistent trace metal contaminants from raw materials comes from acids and bases, for e.g., 5N HCl and NaOH, 12 N HCl, etc. used for adjusting pH and for solubilization of components. Since the proposed streamlined process limits, and in many cases eliminates the need for large volume additions of acid and base, there is less lot to lot variation due to the contribution of metal element concentrations in acids and bases (see FIG. 3);

iv) Lesser side solutions prepared: Part of the streamlined approach is to minimize the number of solutions (or stock solutions, also referred to as side solutions) and pre-solubilization steps. Hence, dry/wet components may be used directly and not "prepared as solutions", unlike the preparation of stock solutions in the 'concentrate technology'. Hence, components present in large volumes, such as acid soluble groupings I & II, salts I & II which were prepared into solutions are instead, added directly in their native forms (that is, if the raw material is a dry powder, the dry powder is added directly to the formulation preparation tank, or if the raw material is a liquid, the liquid is added directly) into the formulation tank in the streamlined approach.

v) Pooling trace solutions: Traditionally in the 'concentrate' method—multiple trace element solutions were prepared as stock solutions. Instead, in streamlined, the multiple trace element solutions are combined together into one complete "trace element solution" leading to one, main tank addition instead of up to eight additions. Typically, high concentration components like amino acids and salts are added first before addition of the lower concentration, more sensitive components. A general order for addition of components can be as shown in FIG. 1: 'streamlined liquid table' to the right, where, in one embodiment, ingredients are added in the order shown from top to bottom of the table.

Therefore, liquids prepared by the streamlined method:

(a) require lesser acid and/or base additions to solubilize the components; and/or, (b) have reduced metal contaminants from acid and/or base additions; and/or, (c) have lesser lot-to-lot variability in metals, (d) requires lesser formulation time since lesser (side) solutions need to be prepared and due to optimized groupings of components, compared to a liquid medium prepared by say the concentrate method. More time is needed to fully solubilize components with wide ranges of pHs and solubilities of concentrated method.

Generally, there is lot-to-lot variability at least in the metal ion concentrations due to the addition of acids and/or bases for the solubilization of components. Due to the reduction in the addition of the volume of acids and bases, and due to the fact that the streamline method totally eliminates 12N concentrated acid in the protocol, the fold reduction in acid/base additions streamlined are about 1-10 fold, 1-20 fold, 1-30 fold, or 1-40 fold, depending on the formulation. In one embodiment, the reduction of acid/base volume was about 22 fold.

The lot-to-lot variability of metals can be measured by a variety of analytical methods, including but not limited to ICP-MS, MS/MS, etc. Either total metal ion concentrations, or specific metal ion concentrations can be measured using suitable analytical methods and the metal ion differences are compared between lots. In a certain embodiment, the lot-to-lot variability of total metal concentration in the streamlined method was reduced by up to 10%. In other embodiments, the total metal lot-to-lot variability was reduced by: about 0.001%, about 0.01%, about 0.1%, about 1%, about 1-2%, about 1-3%, about 1-4%, about 1-5%, about 1-6%, about 1-10%, about 1-20%, about 1-30%, about 1-40%, about 1-50%, about 1-60%, about 1-70%, %, about 1-80%, or about 1-90%.

In other embodiments, individual metal concentration can be measured between various liquid lots. The metals that are measured are selected from the group consisting of: Cr, Fe, Mg, Cu, Mn, Ni, Zn, Mo, Al and Ca. There may be reduction of any metal between the lots of streamlined media as follows: less than about 0.001%, less than about 0.01%, less than about 0.1%, less than about 1%, less than about 2%, less than about 3%, less than about 4%, less than about 5%, less than about 6%, less than about 10%, less than about 15%, less than about 20%, less than about 30%, less than about 40%, less than about 50%, less than about 0.001-1%, less than about 0.001-5%, less than about 0.001-10%, less than about 1-10%, less than about 10-20%, less than about 20-30%, less than about 30-40%, less than about 40-50%, less than about 50-100%, less than about 50-90%, less than about 50-80%, less than about 50-70%, less than about 50-60%. The reduction of the one or more contaminant metal may be compared to liquid medium prepared by any other method, for e.g., the concentrate method of preparing liquid media. In a certain embodiment, the reduction was about 0.0001% to 100%. Or the reduction of the one or more contaminant metal is by about 0.0001% to 0.001%, about 0.0001% to 0.01%, about 0.0001% to 0.1%, about 0.0001% to 1%, about 0.0001% to 2%, about 0.0001% to 3%, about 0.0001% to 4%, about 0.0001% to 5%, about 0.0001% to 10%, about 1%-5%, about 1%-10%, about 1%-15%, about 1%-20%, about 1%-25%, about 1%-35%, about 10-20%, about 10-30%, about 10-40%, about 10-50%, about 10-60%, about 10-70%, about 10-80%, about 10-90%, about 10-100% in the resultant liquid prepared by the streamlined method compared to liquid medium prepared by any other method, for e.g., the concentrate method.

In certain embodiments, the individual % metal contamination is reduced by: about 40-100% for Cr, about 0.01-20% for Fe, about 0.1-15% for Cu, about 0.25-60% for Mn, about 5-100% for Ni, about 5% for Zn, and about 15% for Mo compared to liquid medium prepared by any other method, for e.g., the concentrate method.

The liquid medium prepared by the streamlined method may be serum-free or protein-free or both, low serum, low protein, or a combination thereof. The liquid medium may be used for culturing a cell.

2. Serum-Free Medium

Potential problems associated with serum, including batch to batch variation, high protein content, risk of contaminants (e.g., viruses, mycoplasma, prions), limited availability, and high cost, have driven the production of serum-free media. Furthermore, improved levels of recombinant protein expression can be obtained from cells grown in serum-free medium, relative to the level of expression seen in cells grown in medium supplemented with serum (Battista, P. J. et al., Am. Biotech Lab. 12: 64-68 (1994)).

In these serum-free media, serum can be replaced with a defined hormone, or hormone cocktails, such as HITES or ITES, which contain hydrocortisone, insulin, transferrin, ethanolamine, and selenite. Alternatively, the serum-free media can contain growth factor extracts from endocrine glands, such as epidermal or fibroblast growth factors. Serum-free media can also contain other components as a substitute for serum, including purified proteins (animal or recombinant), peptones, amino acids, inorganic salts, and animal or plant hydrolysates (or fractions thereof).

Serum-free media may be chemically defined or undefined. In chemically defined media, the identity of the components and their amounts are known, whereas the opposite is true for chemically undefined media. Chemically defined media, therefore, are designed, in part, to reduce the risk of contaminants and to reduce batch to batch variation. Chemically defined supplements that can be added to cell culture media include growth factors, hormones, carrier proteins, and/or attachment factors. In a preferred embodiment, the basal medium used with the media or feeds comprising small peptides is a chemically-defined medium. In another preferred embodiment, the concentrated cell culture media or concentrated feed of the invention comprising small peptides is also a chemically-defined composition. In yet another preferred embodiment, the concentrated feed or medium of the invention comprising small peptides including cysteine and tyrosine is a single part feed and is chemically-defined. In another aspect, all the above compositions comprising small peptides including cysteine and tyrosine are auto-pH and auto-osmolality balanced. In yet another aspect, all the above compositions comprising small peptides including cysteine and tyrosine are stoichiometrically balanced.

3. Protein-Free Media

Serum-free media contains reduced amounts of protein as compared to cell culture media containing serum. However, serum-free media may still contain one or more of a variety of animal-derived components, including albumin, fetuin, various hormones and other proteins. The presence of proteins makes purification of recombinant protein difficult, time-consuming, and expensive and can also lead to reduced product yields and/or purity. Thus, in one embodiment, the cell culture medium is protein free.

Protein-free media can be obtained by methods known in the art, such as by removing any remaining proteins from serum-free media. While the removal of such proteins from the cell culture media can impair the media's ability to support cell growth, other components can be added to the media to mitigate the effect of removing the proteins from the media. For example, as discussed above, cyclodextrin can replace BSA and iron salts or a hydroxypyridine derivative can replace transferrin. In other cases, animal tissue or plant hydrolysates (or fractions thereof) have been used to supplement protein-free media.

4. Fed-Batch Cultivation

Fed-batch cultivation of cells is typically used for industrial production of biomolecules, such as proteins, to increase cell concentration and to extend culture lifetime for a high product concentration and volumetric productivity. Fed-batch cultures involve the controlled addition of one or more nutrients, in the form of feeds which may contain nutrients that are quickly utilized by cells such as glucose, amino acids to a basal medium. The nutrient(s) help to control the growth of the cell culture by attempting to prevent nutrient depletion and byproduct accumulation, important parameters, such as pH, osmolality and $CO_2$ concentration, within levels that promote cell growth or minimize cell death for optimal product expression. See Cell Culture Technology for Pharmaceutical and Cell-Based Therapies, 349-386 (Sadettin Ozturk and Wei-Shou Hu eds., Taylor and Francis Group 2006). Even then, fed batch cultures often result in high concentrations of inhibitory metabolites and high osmolalities that eventually are incompatible with cell viability. In fed-batch cultivation, cells are typically grown up to a certain time point in batch mode using a basal medium. Subsequently, a medium supplement (concentrated feed) comprising concentrated solutions of a single or multiple nutrients is added to provide nutrients, while minimizing volume increase or culture dilution. When the medium supplement is added to basal medium, it improves cell culture, as exhibited, for example, by more rapid cell growth, decreased doubling time, higher achievable density of cells, or higher production or yield of biomolecule, such as protein, e.g., antibody or other proteins of therapeutic interest.

5. Basal Media

A basal medium is typically used for maintenance of a cell culture, and can comprise a number of ingredients, including amino acids, vitamins, organic and inorganic salts, sugars and other components, each ingredient being present in an amount which supports the cultivation of the cell in vitro. Basal media useful for prokaryotic cell culture including bacterial and archebacterial cultures, viral cultures, plant cell culture, insect cell culture, mammalian cell culture can be used with the small peptide Examples of basal media include Eagle's basal medium (BME), Eagle's minimal essential medium (EMEM), Dulbecco's modification of Eagle's medium (DMEM), Glasgow's modification of Eagle's medium (GMEM), Joklik's modified Eagle's medium, Alpha modified Eagle's medium, Roswell Park Memorial Institute (RPMI) medium, Fischer's medium, Leibovitz L-15 medium, Trowell's T-8 medium, Williams' medium E, Biggers' medium, Connaught Medical Research Laboratories (CMRL) 1066 medium, Ham's F10 medium, Ham's F12 medium, Iscove's modified Dulbecco's medium (IMDM), MCDB 104, MCDB 110, MCDB 153, Medium 199, NCTC 135 medium, and Waymouth's medium MB 752/1. For CHO cells, preferred basal media include CDCHO™, CD OptiCHO™, and Dynamis™ Medium (all from Life Technologies, Corp., Carlsbad, CA). Preferred concentrated feed supplements for CHO cells include, but are not limited to, EfficientFeed™ A+ AGT™ (Invitrogen Cat. No. A25023), EfficientFeed™ B+ AGT™ (Invitrogen Cat. No. A25030), Feed™ Kit A+, B+, C+ (Invitrogen Cat. No. A3315801), EfficientFeed™ C+ AGT™ (Invitrogen Cat. No. A25031, Life Technologies Corp., Carlsbad, CA).

6. Cells

The disclosure is directed to methods for culturing cells in a liquid medium prepared according to streamlined method, wherein the cells include primary epithelial cells (e.g., keratinocytes, cervical epithelial cells, bronchial epithelial cells, tracheal epithelial cells, kidney epithelial cells and retinal epithelial cells) and established cell lines and their strains (e.g., CHO cells, 293 embryonic kidney cells, BHK cells, diploid cells for vaccine production including MRC-5, 2BS and others, hybridomas, HeLa cervical epithelial cells and PER-C6 retinal cells, MDBK (NBL-1) cells, 911 cells, CRFK cells, MDCK cells, BeWo cells, Chang cells, Detroit 562 cells, HeLa 229 cells, HeLa S3 cells, Hep-2 cells, KB cells, LS180 cells, LS174T cells, NCI-H-548 cells, RPMI 2650 cells, SW-13 cells, T24 cells, WI-28 VA13, 2RA cells, WISH cells, BS-C-I cells, LLC-MK$_2$ cells, Clone M-3 cells, 1-10 cells, RAG cells, TCMK-1 cells, Y-1 cells, LLC-PK$_1$ cells, PK(15) cells, GH$_1$ cells, GH$_3$ cells, L2 cells, LLC-RC 256 cells, MH$_1$C$_1$ cells, XC cells, MDOK cells, VSW cells, and TH-I, B1 cells, or derivatives thereof), fibroblast cells from any tissue or organ (including but not limited to heart, liver, kidney, colon, intestines, esophagus, stomach, neural tissue (brain, spinal cord), lung, vascular tissue (artery, vein, capillary), lymphoid tissue (lymph gland, adenoid, tonsil, bone marrow, and blood), spleen, and fibroblast and fibroblast-like cell lines (e.g., CHO cells, TRG-2 cells, IMR-33 cells, Don cells, GHK-21 cells, citrullinemia cells, Dempsey cells, Detroit 551 cells, Detroit 510 cells, Detroit 525 cells, Detroit 529 cells, Detroit 532 cells, Detroit 539 cells, Detroit 548 cells, Detroit 573 cells, HEL 299 cells, IMR-90 cells, MRC-5 cells, WI-38 cells, WI-26 cells, MiCl$_1$ cells, CV-1 cells, COS-1 cells, COS-3 cells, COS-7 cells, Vero cells, DBS-FrhL-2 cells, BALB/3T3 cells, F9 cells, SV-T2 cells, M-MSV-BALB/3T3 cells, K-BALB cells, BLO-11 cells, NOR-10 cells, C$_3$H/IOTI/2 cells, HSDM$_1$C$_3$ cells, KLN$_2$O$_5$ cells, McCoy cells, Mouse L cells, Strain 2071 (Mouse L) cells, L-M strain (Mouse L) cells, L-MTK⁻ (Mouse L) cells, NCTC clones 2472 and 2555, SCC-PSA1 cells, Swiss/3T3 cells, Indian muntjac cells, SIRC cells, C$_{II}$ cells, and Jensen cells, Sp2/0, NS0, NS1 cells or derivatives thereof), a stem cell, an iPSC cells, etc. Any of the above cells can be engineered to expresses: a recombinant product, a protein or a recombinant protein, a fusion product or protein, an antibody or an antibody fragment, a fusion or modified antibody, a virus or a viral product or component, a VLP (viral like particle), a cell, a nucleic acid, a lipid, a hormone, a steroid, or a glycoprotein.

Therefore, the disclosure is also directed to methods for making a biological product in a liquid medium prepared according to streamlined method, wherein the biological product is a recombinant product, a protein or a recombinant protein, a fusion product or protein, an antibody or an antibody fragment, a fusion or modified antibody, a virus or a viral product or component, a VLP (viral like particle), a cell, a nucleic acid, a lipid, a hormone, a steroid, or a glycoprotein.

Example 1: Making Liquid Medium with Minimal Addition of Acid/Base

The current common liquid manufacturing process utilizes large volumes of acids and bases to solubilize categorical groups of components such as amino acids. This process has several disadvantages. Excessive acid and base usage are associated with lot-to-lot variability due to metal contaminants and potential modification or damage to media components. The bioproduction industry has voiced concern over the lack of consistency and control of metal concentrations in cell culture media and potential cell toxicity due to metals. In addition, regulatory agencies are requiring lower levels of heavy metals in products for better disposal and environmental concerns.

In order to reduce this variability, a novel manufacturing approach was developed which relies on groupings of components, for e.g., amino acids, optimizing component forms, and optimizing orders of addition to considerably reduce the amount of acid and base previously utilized to solubilize media components. In an example, the liquid manufacturing process for the culture medium CDCHO™ (from Life Technologies, Corp., Carlsbad, CA; see Table 2 below) was modified by incorporating the most soluble forms of components and by optimizing the grouping of components and the order of addition based on: 1) pH, 2) concentration and 3) component sensitivity or reactivity. The new process resulted in a 22-fold reduction in the use of 5N acids and bases, as well as the complete elimination of 12N concentrated acid. This approach demonstrated a reduction in acid/base associated contaminant metals with a 3-fold reduction in chromium and a 2-fold in nickel to the final formulation.

Figure 6:
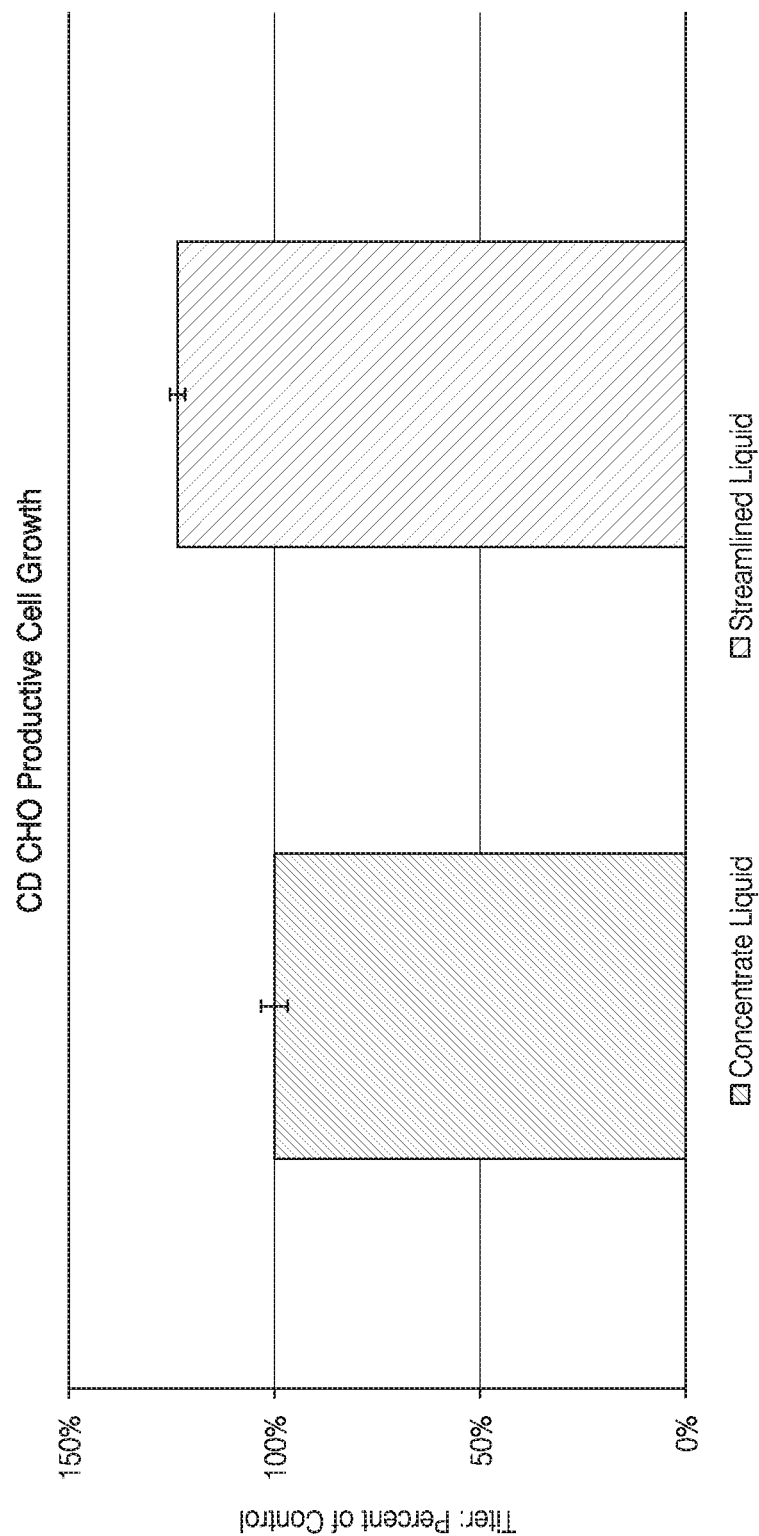
FIG. 6 shows the IgG titer performance comparison in liquid CDCHO™ media prepared by concentrate liquid method versus by the streamlined liquid method. In media prepared by the 'streamlined' method, CHO-S cells demonstrated increased protein productivity of about 124% when compared to protein productivity in liquid medium prepared by the traditional 'concentrate' control method.

The new method also streamlined and simplified the manufacturing process by reducing the number of side solutions, pH adjustments and formulation process time, which resulted in significant manufacturing cost reductions and increased safety. In particular, with CDCHO™, the number of side solutions was reduced by 27% and the number of acid/base additions and pH adjustments decreased by 33%; which overall, resulted in a reduction to formulation time of 43%. This method also enabled more consistency between lot-to-lot metal ion concentration, which may contribute to less variability in performance. In fact, improved performance in CDCHO™ prepared by streamlined method was observed over CDCHO™ media prepared by the concentrate technology, as can be seen in FIG. 6.

Methods

Initially, components were assessed for optimal solubility at desired pH.

Components were then grouped into component categories, for e.g., amino acids, vitamins, salts, sugars, trace metals, buffers, and a group comprising sensitive or reactive components. The sensitive or reactive group included these components, but are not limited to these only, namely: polyamines, reactive magnesium chloride, choline chloride, hygroscopic glucose and pluronic. Some of these components may exhibit poor solubility or pH drift due to long mixing times.

Components were assessed for weighability at a final g/L concentration (currently 1 mg/L). Components below the threshold needed concentrated side solutions that were freshly prepared.

Components were assessed for upper solubility limits based on the Merck Index, or based on common knowledge known in the literature, or standardized internally using methods routine in the art. Components above the limits needed to be solubilized with minimal acid or base prior to main tank addition.

Components that require a chemical reaction (for example, iron chelates) need to be prepared freshly separately, to manage the reaction requirements (for e.g., to manage pH, process, timeline).

Each group of components were re-examined to determine the optimal pH grouping, and components with similar pH were separated into acidic, basic and neutral sub-groups. This is especially critical for amino acids. An exemplary classification of amino acids is shown in Table 2. Bench top confirmation of the groupings is highly recommended before preparation of the final formulation.

The order of addition of components into the final formulation tank was based on: 1) pH and 2) concentration and 3) component sensitivity or reactivity. These were standardized/confirmed with a benchtop pilot run at 20 liter minimum scale, with an additional testing at 100 liter.

The CD media components used in Example 1 is shown in Table 2:

TABLE 2

| | CD Media Components | | |
|---|---|---|---|
| Ingredient | Concentration Range (g/L) | Preferred Embodiment (g/L) About | Particularly Preferred Embodiment (g/L) |
| L-arginine | 0.1000-0.7200 | 0.4 | 0.36192 |
| L-asparagine•$H_2O$ | 0.1000-1.8000 | 0.9 | 0.90480 |
| L-aspartic acid | 0.0100-0.3600 | 0.7 | 0.18096 |
| L-glutamic acid | 0.1000-0.6000 | 0.3 | 0.27144 |
| L-histidine | 0.0600-0.3600 | 0.2 | 0.18096 |
| hydroxy-L-proline | 0.0040-0.3600 | 0.2 | 0.18096 |
| L-isoleucine | 0.1000-0.7200 | 0.4 | 0.36192 |
| L-leucine | 0.1000-1.1000 | 0.5 | 0.54288 |
| L-lysine•HCl | 0.2000-1.1000 | 0.5 | 0.54288 |
| L-methionine | 0.0500-0.2400 | 0.1 | 0.12667 |
| L-phenylalanine | 0.0900-0.4200 | 0.2 | 0.21715 |
| L-proline | 0.0500-1.1000 | 0.5 | 0.54288 |
| L-serine | 0.1000-1.1000 | 0.5 | 0.54288 |
| L-threonine | 0.1000-0.7200 | 0.4 | 0.36192 |
| L-tryptophan | 0.0200-0.4200 | 0.2 | 0.20810 |
| L-tyrosine | 0.1000-03600 | 0.2 | 0.18096 |
| L-valine | 0.1000-0.7200 | 0.4 | 0.36192 |
| L-cystine•2HCl | 0.0200-0.2200 | 0.1 | 0.10496 |
| $Na_2HPO_4$ (anhydrous) | 0.2000-2.5000 | 0.6 | 0.63336 |
| pyridoxine•HCl | 0.0010-0.0072 | 0.004 | 0.00362 |
| thiamine•HCl | 0.0010-0.0072 | 0.004 | 0.00362 |
| glutathione | 0.0006-0.0036 | 0.002 | 0.00181 |
| zinc sulfate•$7H_2O$ | 0.0003-0.0032 | 0.002 | 0.00156 |
| cupric sulfate•$5H_2O$ | 0.000001-0.000009 | 0.000005 | 0.000004524 |
| cadmium chlolde•$5H_2O$ | 0.000004-0.000040 | 0.00002 | 0.000020629 |
| cobalt chloride•$6H_2O$ | 0.0000006-0.0000086 | 0.000004 | 0.000004343 |
| stannous chloride•$2H_2O$ | 0.00000001-0.00000020 | 0.0000001 | 0.000000101 |
| manganous sulfate•$H_2O$ | 0.00000001-0.00000030 | 0.0000002 | 0.000000152 |
| nickel sulfate•$6H_2O$ | 0.00000005-00000024 | 0.0000001 | 0.000000118 |
| sodium metavanadate | 0.0000003-0000012 | 0.0000006 | 0.000000561 |
| ammonium molybdate•$4H_2O$ | 0.00000300-0.0000110 | 0.000005 | 0.000005429 |
| barium acetate | 0.00000065-0.00000240 | 0.000001 | 0.000001176 |
| potassium bromide | 0.00000003-0.00000011 | 0.00000005 | 0.000000054 |
| potassium iodide | 0.000000045-0.00000016 | 0.00000008 | 0.000000081 |
| chromium sulfate | 0.000000165-0.00000060 | 0.0000003 | 0.000000299 |
| sodium fluoride | 0.00000105-0.00000360 | 0.000002 | 0.000001810 |
| silver nitrate | 0.000000045-0.00000016 | 0.00000008 | 0.000000081 |
| rubidium chloride | 0.00000035-0.0000013 | 0.0000006 | 0.000000633 |
| zirconyl chloride | 0.0000008-0.0000029 | 0.000001 | 0.000001448 |
| aluminum chloride | 0.0000003-0.0000011 | 0.0000005 | 0.000000543 |
| germanium dioxide | 0.000000135-0.00000049 | 0.0000002 | 0.000000244 |
| titanium tetrachloride | 0.00000025-0.0000009 | 0.0000005 | 0.000000452 |
| sodium metasilicate | 0.00005-0.00095 | 0.0005 | 0.000452400 |
| $MgCL_2$ (anhydrous) | 0.0100-0.1400 | 0.07 | 0.06985 |
| D-Calcium pantothenate | 0.0020-0.0060 | 0.004 | 0.00362 |
| Calcium nitrate•$4H_2O$ | 0.01800-0.3600 | 0.09 | 0.09048 |

TABLE 2-continued

CD Media Components

| Ingredient | Concentration Range (g/L) | Preferred Embodiment (g/L) About | Particularly Preferred Embodiment (g/L) |
|---|---|---|---|
| KCl | 0.3340-1.4500 | 0.7 | 0.72384 |
| Ascorbic acid, Mg salt phosphate | 0.00199-0.040 | 0.02 | 0.01991 |
| Pluronic F68, 10% Solution | 5.0 mL-40.0 mL/L (0.5-4.0 g/L) | 18 (2 | 18.096 (1.8096 |
| Na$_2$HPO$_4$ (anhydrous) | 0.018-0.360 | 0.09 | 0.09048 |
| D-glucose | 1.000-12.60 | 6 | 6.33360 |
| folic acid | 0.002-0.0072 | 0.004 | 0.00362 |
| riboflavin | 0.0002-0.00072 | 0.0004 | 0.000362 |
| biotin | 0.000575-0.00360 | 0.002 | 0.00181 |
| choline chloride | 0.0280-0.1810 | 0.09 | 0.09048 |
| niacinamide | 0.0003-0.00724 | 0.004 | 0.00362 |
| i-inositol | 0.0260-0.127 | 0.06 | 0.06334 |
| sodium pyruvate | 0.070-0.400 | 0.2 | 0.19906 |
| vitamin B-12 | 0.0005-0.0018 | 0.0009 | 0.00090 |
| β-mercaptoethanol | 0.00014-0.00282 | 0.001 | 0.00141 |
| para-aminobenzoic acid | 0.0010-0.00362 | 0.002 | 0.00181 |
| β-glycerophosphate | 0.090-1.800 | 0.9 | 0.90480 |
| sodium selenite | 0.00000157-0.000032 | 0.00002 | 0.0000157 |
| ethanolamine•HCl | 0.0075-0.0280 | 0.01 | 0.01357 |
| spermine | 0.0009-0.0181 | 0.009 | 0.00905 |
| putrescine•2HCl | 0.00012-0.00110 | 0.0005 | 0.000543 |
| monothioglycerol | 0.0100-0.0362 | 0.02 | 0.01810 |
| NaHCO$_3$ | 1-4 | 2 | 2.22 |

The iron chelate compound is added as indicated in FIG. 1 to the 1× medium prior to filter sterilization.

An Exemplary Method for making liquid media using the streamlined method: any exemplary liquid formulation as shown in Tables 2 above, and Tables 3-5 below can be used in the streamlined method 1) Modify and convert an amino acid's free base form/salt form to target a particular pH according to the components in the formulation.

2) Modify amino acid group into multiple sub-groups according to pH with acidic, basic and neutral groupings with order of addition optimized based on theoretical solubilities, pH and bench top testing. An exemplary order of amino group addition to the formulation tank was determined to be as follows: 1) acidic, 2) basic and 3) neutral.

3) Modify and convert equimolar phosphate form from all dibasic sodium phosphate to a combination of monobasic and dibasic forms to achieve a desired final target pH.

4) Optionally, convert equimolar spermine form to spermine hydrochloride.

5) Unnecessary side solutions were removed and incorporated as main formulation tank direct additions (meaning, instead of solutions, components were directly added in their native forms).

6) Modify current multiple trace element side solution additions to the main formulation tank with creation and addition of one, complete, trace element solution (combine trace element solutions).

7) Modify solubilization process for folic acid (above solubility limit) from freshly prepared pH solution to minimal sodium hydroxide solubilized side solution.

8) Incorporated new, freshly prepared iron chelation solution best practice of targeting acid addition based on iron and EDTA concentration.

9) Modify vitamin group to remove choline chloride (hygroscopic) into a separate group.

10) Modify glucose into its own new group (potential reactivity and most frequent custom modification).

11) Created a higher concentration salts group with approximately 85% of final theoretical sodium chloride. (Previously only osmolality adjustment addition.)

12) Created ~7.5% pluronic side solution to minimize foaming in tank and reduce mix time to solubilize. (Previously direct addition at end).

The ingredients listed in the following Tables 3-5 below, can be admixed together according to the methods described above, to form a complete liquid culture medium prepared by the streamlined method. These complete media are suitable for use in the culture of a variety of mammalian cells, for e.g., 293 cells. 293 cells are also referred to as HEK 293 cells. Based on the information presented in Tables 3-5, and the knowledge possessed by those of ordinary skill in the art, one can obtain operative streamlined liquid media formulations without undue experimentation.

TABLE 3

Complete Medium Preferred Ranges of Ingredients

| COMPONENT | Gram(s)/L (unless noted) about: | COMPONENT | Gram(s)/L (unless noted) about: |
|---|---|---|---|
| L-Arginine HCl | 0.05-2.50 | Ammonium Meta Vanadate | 0.0000001-0.000003 |
| L-Asparagine | 0.005-0.05 | Manganous Chloride 4H$_2$O | 0.00000001-0.0000005 |
| L-Aspartic Acid | 0.03-0.8 | Pyridoxine HCl | 0.0002-0.005 |
| L-Cysteine HCl H$_2$O | 0.03-0.8 | Thiamine HCl | 0.0002-0.006 |
| L-Glutamic Acid | 0.002-0.05 | Ferric Nitrate 9H$_2$O | 0.0002-0.004 |
| L-Histidine HCl H$_2$O | 0.01-0.3 | Magnesium Sulfate | 0.005-0.1 |

TABLE 3-continued

Complete Medium
Preferred Ranges of Ingredients

| COMPONENT | Gram(s)/L (unless noted) about: | COMPONENT | Gram(s)/L (unless noted) about: |
|---|---|---|---|
| L-Isoleucine | 0.04-1 | Zinc Sulfate | 0.00008-0.002 |
| L-Leucine | 0.06-1.5 | Zinc Chloride | 0.00005-0.001 |
| L-Lysine HCl | 0.05-1.25 | Ascorbic Acid | 0.00000005-0.0000003 |
| L-Methionine | 0.02-0.6 | D-Calcium Pantothenate | 0.0002-0.006 |
| L-Phenylalanine | 0.02-0.5 | Calcium Chloride | 0.002-0.06 |
| L-Serine | 0.07-2 | Magnesium Chloride | 0.02-0.4 |
| L-Threonine | 0.02-0.6 | Potassium Chloride | 0.06-1.2 |
| L-Tryptophan | 0.008-0.2 | Sodium Selenite | 0.0000000001-0.00000003 |
| L-Valine | .03-1 | Vitamin B12 | 0.00002-0.005 |
| L-Tyrosine 2Na 2 H$_2$O | 0.02-0.5 | Choline Chloride | 0.003-0.07 |
| L-Glutamine (recommended addition, formulation does not contain) | 0.1-3 | i-Inositol | 0.004-0.09 |
| D-Glucose (Dextrose) | 1-25 | Niacinamide | 0.0002-0.006 |
| Lipoic Acid | 0.0004-0.01 | Ethanolamine HCl | 0.001-0.3 |
| Linoleic Acid | 0.00001-0.0003 | Putrescine 2HCl | 0.00003-0.008 |
| Folic Acid | 0.0001-003 | Sodium Pyruvate | 0.02-0.6 |
| HEPES | 0.5-15 | Riboflavin | 0.00004-0.001 |
| 2-Hydroxypyridine-n-oxide | 0.0006-0.02 | Biotin | 0.00002-0.0005 |
| Pluronic F-68* | 0.06-2 | Sodium Bicarbonate | 0.5-2 |
| Sodium Phosphate Monobasic H$_2$O | 0.03-0.6 | Sodium Chloride *** | 0.6-16 *** |

*** Added to adjust osmolarity. Quantity will vary somewhat between formulations. NaCL is added to adjust osmo from ~160 to a value within 275+/−5 mOsmo

TABLE 4

Exemplary Medium

| COMPONENT | Gram(s)/L (unless noted) about: | COMPONENT | Gram(s)/L (unless noted) about: |
|---|---|---|---|
| L-Arginine HCl | 0.4 | Ammonium Meta Vanadate | 0.0000006 |
| L-Asparagine | 0.03 | Manganous Chloride 4H$_2$O | 0.0000001 |
| L-Aspartic Acid | 0.2 | Pyridoxine HCl | 0.001 |
| L-Cysteine HCl H$_2$O | 0.2 | Thiamine HCl | 0.001 |
| L-Glutamic Acid | 0.01 | Ferric Nitrate 9H$_2$O | 0.0008 |
| L-Histidine HCl H$_2$O | 0.06 | Magnesium Sulfate | 0.02 |
| L-Isoleucine | 0.2 | Zinc Sulfate | 0.0004 |
| L-Leucine | 0.3 | Zinc Chloride | 0.0003 |
| L-Lysine HCl | 0.2 | Ascorbic Acid | 0.0000003 |
| L-Methionine | 0.1 | D-Calcium Pantothenate | 0.001 |
| L-Phenylalanine | 0.1 | Calcium Chloride | 0.01 |
| L-Serine | 0.4 | Magnesium Chloride | 0.08 |
| L-Threonine | 0.1 | Potassium Chloride | 0.3 |
| L-Tryptophan | 0.04 | Sodium Selenite | 0.000000007 |
| L-Valine | 0.2 | Vitamin B$_{12}$ | 0.001 |
| L-Tyrosine 2Na 2 H$_2$O | 0.1 | Choline Chloride | 0.01 |
| L-Glutamine (recommended addition, formulation does not contain) | 0.6 | i-Inositol | 0.02 |
| D-Glucose (Dextrose) | 5 | Niacinamide | 0.001 |
| Lipoic Acid | 0.002 | Ethanolamine HCl | 0.005 |
| Linoleic Acid | 0.00006 | Putrescine 2HCl | 0.0002 |
| Folic Acid | 0.0005 | Sodium Pyruvate | 0.1 |
| HEPES | 3.0 | Riboflavin | 0.0002 |
| 2-Hydroxypyridine-n-oxide | 0.003 | Biotin | 0.0001 |
| Pluronic F-68* | 0.3 | Sodium Bicarbonate | 2.0 |
| Sodium Phosphate Monobasic H$_2$O | 0.1 | Sodium Chloride *** | 3.0 *** |

*** Added to adjust osmolarity. Quantity will vary somewhat between formulations. NaCL is added to adjust osmo from ~160 to a value within 275+/−5 mOsmo

TABLE 5

Well Defined Medium

| COMPONENT | Gram(s)/L (unless noted) about: | COMPONENT | Gram(s)/L (unless noted) about: |
|---|---|---|---|
| L-Arginine HCl | 0.43 | Ammonium Meta Vanadate | 0.0000006 |
| L-Asparagine | 0.0264 | Manganous Chloride 4H$_2$O | 0.0000001 |
| L-Aspartic Acid | 0.15 | Pyridoxine HCl | 0.00103 |
| L-Cysteine HCl H$_2$O | 0.15 | Thiamine HCl | 0.00112 |
| L-Glutamic Acid | 0.01 | Ferric Nitrate 9H$_2$O | 0.00081 |
| L-Histidine HCl H$_2$O | 0.06 | Magnesium Sulfate | 0.0241 |
| L-Isoleucine | 0.2 | Zinc Sulfate | 0.000375 |
| L-Leucine | 0.3 | Zinc Chloride | 0.00025 |
| L-Lysine HCl | 0.25 | Ascorbic Acid | 0.00000025 |
| L-Methionine | 0.115 | D-Calcium Pantothenate | 0.00119 |
| L-Phenylalanine | 0.1 | Calcium Chloride | 0.0111 |
| L-Serine | 0.388 | Magnesium Chloride | 0.0762 |
| L-Threonine | 0.12 | Potassium Chloride | 0.2763 |
| L-Tryptophan | 0.04 | Sodium Selenite | 0.0000000067 |
| L-Valine | 0.19 | Vitamin B$_{12}$ | 0.00103 |
| L-Tyrosine 2Na 2 H$_2$O | 0.1 | Choline Chloride | 0.014 |
| L-Glutamine (recommended addition, formulation does not contain) | 0.584 | i-Inositol | 0.018 |
| D-Glucose (Dextrose) | 5 | Niacinamide | 0.00122 |
| Lipoic Acid | 0.002 | Ethanolamine HCl | 0.005 |
| Linoleic Acid | 0.00006 | Putrescine 2HCl | 0.00016 |
| Folic Acid | 0.0005 | Sodium Pyruvate | 0.11 |
| HEPES | 2.98 | Riboflavin | 0.00022 |
| 2-Hydroxypyridine-n-oxide | 0.003 | Biotin | 0.000097 |

TABLE 5-continued

Well Defined Medium

| COMPONENT | Gram(s)/L (unless noted) about: | COMPONENT | Gram(s)/L (unless noted) about: |
|---|---|---|---|
| Pluronic F-68* | 0.3 | Sodium Bicarbonate | 2.4 |
| Sodium Phosphate Monobasic H$_2$O | 0.125 | Sodium Chloride *** | 3.126 *** |

*** Added to adjust osmolarity. Quantity will vary somewhat between formulations. NaCL is added to adjust osmo from ~160 to a value within 275+/ −5 mOsmo While the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for preparing a liquid medium comprising:
   grouping amino acids in a formulation according to their pH, solubility, and concentration;
   wherein the amino acids are acidic, basic, and neutral amino acids;
   converting the amino acids into their free base form or salt form to target a particular pH according to other media components in the formulation;
   separating the converted amino acids into acidic, basic, and neutral sub-groups;
   matching the grouped amino acids to determine an order of addition based on their acidic, basic, and neutral sub-groups, such that when adding the converted amino acid based on the grouping of the amino acids to a formulation tank in the order of addition determined reduces adding additional acids or bases to achieve a particular pH for the liquid medium;
   wherein the additional acids or bases comprise at least one metal contaminant;
   adding water to the formulation tank; and
   adding the converted amino acids to the formulation tank in the order of addition determined based on the matching, wherein the order of addition reduces a level of the at least one metal contaminant in the formulation tank as the other media components are being added to prepare the liquid medium at the particular pH.

2. The method of claim 1, wherein said at least one metal contaminant is selected from: Cr, Fe, Mg, Cu, Mn, Ni, Zn, Mo, Al, and Ca.

3. The method of claim 1, wherein percentage reduction of said at least one metal contaminant is selected from a group consisting of: 40-100% for Cr, 0.01-20% for Fe, 0.1-15% for Cu, 0.25-60% for Mn, 5-100% for Ni, 5% for Zn, and 15% for Mo.

4. The method of claim 1, wherein the level of said at least one metal contaminant in the liquid medium is reduced by a percentage compared to adding the amino acids in a different order.

5. The method of claim 4, wherein the percentage is selected from a group consisting of: 0.0001% to 0.001%, 0.0001% to 0.01%, 0.0001% to 0.1%, 0.0001% to 1%, 0.0001% to 2%, 0.0001% to 3%, 0.0001% to 4%, 0.0001% to 5%, 0.0001% to 10%, 1%-5%, 1%-10%, 1%-15%, 1%-20%, 1%-25%, 1%-35%, 10-20%, 10-30%, 10-40%, 10-50%, 10-60%, 10-70%, 10-80%, 10-90%, and 10-100%.

6. The method of claim 1, further comprising:
   grouping one or more of the other media components in the formulation according to their pH, solubility, and concentration; and
   adding the other media components to the formulation tank according to the grouping.

7. The method of claim 1, further comprising: wherein the other media components comprise dibasic sodium phosphate; and
   converting dibasic sodium phosphate to a combination of monobasic and dibasic forms to achieve the particular pH.

8. The method of claim 1, wherein each of the amino acids is converted from its native form into free base form or salt form based on the particular pH.

9. The method of claim 4, wherein the liquid medium has less lot-to-lot variability in metals.

10. The method of claim 9, wherein the lot-to-lot variability in metals is less than 10%.

11. The method of claim 9, wherein the lot-to-lot variability of total metal concentrations is selected from a group consisting of: less than 0.001%, less than 0.01%, less than 0.1%, less than 1%, less than 1-2%, less than 1-3%, less than 1-4%, less than 1-5%, less than 1-6%, less than 1-10%, less than 1-20%, less than 1-30%, less than 1-40%, less than 1-50%, less than 1-60%, less than 1-70%, %, less than 1-80%, and less than 1-90%.

12. The method of claim 9, wherein the lot-to-lot variability for any metal concentration between various liquid lots is selected from a group consisting of: less than 0.001%, less than 0.01%, less than 0.1%, less than 1%, less than 2%, less than 3%, less than 4%, less than 5%, less than 6%, less than 10%, less than 15%, less than 20%, less than 30%, less than 40%, less than 50%, less than 0.001-1%, less than 0.001-5%, less than 0.001-10%, less than 1-10%, less than 10-20%, less than 20-30%, less than 30-40%, less than 40-50%, less than 50-100%, less than 50-90%, less than 50-80%, less than 50-70%, and less than 50-60%.

13. The method of claim 1, wherein the order of addition determined eliminates the need for adding 5N acids and bases to achieve the particular pH for the liquid medium.

14. A method for culturing a cell, comprising contacting the cell with a liquid medium prepared by the method of claim 1.

15. The method of claim 14, wherein the liquid medium is serum-free.

16. The method of claim 14, wherein the liquid medium is protein-free.

17. The method of claim 14, wherein the cell is selected from the group consisting of primary epithelial cells, established cell lines and their strains, recombinantly engineered cells, diploid cells, hybridomas, Chinese hamster ovary (CHO) cells, HEK293 cells, TRG-2 cells, IMR-33 cells, Don cells, GHK-21 cells, citrullinemia cells, Dempsey cells, Detroit 551 cells, Detroit 510 cells, Detroit 525 cells, Detroit 529 cells, Detroit 532 cells, Detroit 539 cells, Detroit 548 cells, Detroit 573 cells, HEL 299 cells, IMR-90 cells, MRC-5 cells, WI-38 cells, WI-26 cells, MiCl1 cells, CV-1 cells, COS-1 cells, COS-3 cells, COS-7 cells, Vero cells, DBS-FrhL-2 cells, BALB/3T3 cells, F9 cells, SV-T2 cells, M-MSV-BALB/3T3 cells, K-BALB cells, BLO-11 cells, NOR-10 cells, C3HAOTI/2 cells, HSDM1C3 cells, KLN205 cells, McCoy cells, Mouse L cells, Strain 2071 (Mouse L) cells, L-M strain (Mouse L) cells, L-MTK- (Mouse L) cells, NCTC clones 2472 and 2555, SCC-PSA1 cells, Swiss/3T3 cells, Indian muntjac cells, SIRC cells, CII cells, Jensen cells, Sp 2/0 cells, NSO cells, NS1 cells, iPSC cells or derivatives thereof.

18. The method of claim 14, wherein the cell expresses a product selected from the group consisting of a recombinant protein, a fusion protein, an antibody, an antibody fragment, a fusion or modified antibody, a virus or a viral component, a VLP (viral like particle), a cell, a nucleic acid, a lipid, a hormone, a steroid, and a glycoprotein.

19. The method of claim 17, wherein the primary epithelial cells are selected from the group consisting of keratinocytes, cervical epithelial cells, bronchial epithelial cells, tracheal epithelial cells, kidney epithelial cells and retinal epithelial cells.

20. A method for making a biological product in the liquid medium of claim 1, wherein the biological product is a recombinant product.

21. The method of claim 20, wherein the recombinant product is selected from the group consisting of a recombinant protein, a fusion product, an antibody or an antibody fragment, a fusion or modified antibody, a virus or a viral component, a VLP (viral like particle), a cell, a nucleic acid, a lipid, a hormone, a steroid, or a glycoprotein.

\* \* \* \* \*